United States Patent
Nabeiro

(10) Patent No.: US 10,136,753 B2
(45) Date of Patent: Nov. 27, 2018

(54) MACHINE FOR PREPARING BEVERAGES WITH DISPOSITION FOR ACTUATION OF SINGLE DOSE PACKAGES

(71) Applicant: NOVADELTA-COMÉRCIO E INDÚSTRIA DE CAFÉS S.A, Lisbon (PT)

(72) Inventor: Rui Miguel Nabeiro, Campo Maior (PT)

(73) Assignee: NOVADELTA-COMÉRCIO E INDÚSTRIA DE CAFÉS S.A, Lisbon (PT)

( * ) Notice: Subject to any disclaimer, the term of this patent is extended or adjusted under 35 U.S.C. 154(b) by 0 days.

(21) Appl. No.: 15/513,455

(22) PCT Filed: Sep. 22, 2015

(86) PCT No.: PCT/PT2015/050008
§ 371 (c)(1),
(2) Date: Mar. 22, 2017

(87) PCT Pub. No.: WO2016/048182
PCT Pub. Date: Mar. 31, 2016

(65) Prior Publication Data
US 2017/0295986 A1 Oct. 19, 2017

(30) Foreign Application Priority Data
Sep. 23, 2014 (PT) .......................................... 107902

(51) Int. Cl.
*A47J 31/36* (2006.01)
(52) U.S. Cl.
CPC ................................ *A47J 31/3647* (2013.01)

(58) Field of Classification Search
CPC ......... G03G 31/36; G03G 31/47; A47J 31/14; A47J 31/369; A47J 31/3695; A47J 31/407;
(Continued)

(56) References Cited

U.S. PATENT DOCUMENTS 5,520,093 A * 5/1996 Ackermann ........ A47J 31/3657
99/289 T
9,117,326 B2 * 8/2015 Cerveny ................... B65B 3/06
(Continued)

FOREIGN PATENT DOCUMENTS

DE 43 38 629 C1 8/1994
GB 2 266 228 A 10/1993
(Continued)

OTHER PUBLICATIONS

Machine English language translation of WO9902081 Jan. 1999.*
(Continued)

*Primary Examiner* — Hoa V Le
(74) *Attorney, Agent, or Firm* — Sughrue Mion, PLLC

(57) ABSTRACT

A machine (1) and process for preparing aromatic beverages by means of extraction, such as espresso coffee and similar, and adapted to supply a support (21) of single portions, comprising a plurality of single dose portions (22), to at least one extraction device (3) by means of an actuation device (6) disposed upstream of the extraction device (3) and comprising an actuation element (61) provided so that it can move the support (21) of single portions by means of rotation. In particular, the actuation device (6) further comprises a back-pressure element (62) that exerts a back-pressure upon the support (21) of single portions in the direction of the perimeter actuation surface (63), thereby providing greater operation reliability in the supply of the single dose portions (22) to an extraction device (3).

15 Claims, 5 Drawing Sheets

(58) Field of Classification Search
CPC .... A47J 31/4403; A47J 31/3657; A47J 31/46; A47J 31/4485; A47J 31/40; A47J 31/44
See application file for complete search history.

(56) References Cited

U.S. PATENT DOCUMENTS

| | | | | |
|---|---|---|---|---|
| 2005/0139082 | A1* | 6/2005 | Brouwer | A47J 31/30 99/279 |
| 2011/0274794 | A1* | 11/2011 | Gerbaulet | B65D 85/8043 426/115 |
| 2012/0009304 | A1* | 1/2012 | Perentes | A47J 31/22 426/110 |
| 2014/0287104 | A1* | 9/2014 | Austin | B65D 85/8043 426/115 |
| 2015/0050389 | A1* | 2/2015 | Stewart | A23F 3/14 426/78 |

FOREIGN PATENT DOCUMENTS

| | | | | |
|---|---|---|---|---|
| WO | 97/17006 | A1 | 5/1997 | |
| WO | 99/02081 | A1 | 1/1999 | |
| WO | 2013/169134 | A2 | 11/2013 | |
| WO | 2013169134 | A2 * | 11/2013 | A47J 31/36 |

OTHER PUBLICATIONS

Machine English translation of W) 2013169134 A2, Nov. 2013.*
International Search Report for PCT/PT2015/050008 dated Dec. 18, 2015 [PCT/ISA/210].
Written Opinion for PCT/PT2015/050008 dated Dec. 18, 2015 [PCT/ISA/237].

* cited by examiner

MACHINE FOR PREPARING BEVERAGES WITH DISPOSITION FOR ACTUATION OF SINGLE DOSE PACKAGES

CROSS REFERENCE TO RELATED APPLICATIONS

This application is a National Stage of International Application No. PCT/PT2015/050008, filed on Sep. 22, 2015, which claims priority from Portuguese Patent Application No. 107902, filed on Sep. 23, 2014, the contents of all of which are incorporated herein by reference in their entirety.

FIELD OF INVENTION

The present invention refers to the field of machines for preparing beverages by means of extraction, in particular machines presenting a disposition for actuation of packages adapted so as to move single dose packages successively supply to an extraction device.

The present invention further refers to a process for preparing beverages based upon a machine of the type of the present invention.

BACKGROUND OF THE INVENTION

The prior art includes several solutions relating to machines for preparing beverages from an edible substance includes several solutions relating to machines for preparing beverages from an edible substance, such as for example machines for coffee of the espresso type that operate by means of extraction of roasted ground coffee, provided in a substantially hermetic package, for example in the form of a rigid capsule or of flexible pod. The hermetic property of said package is essential to ensure the conservation of aromatic properties of the edible substance.

In particular, adapted so as to process a plurality of single portion packages provided in a strip-like or similar support that is displaced so as to successively supply an extraction device adapted so as to extract a respective beverage.

Document U.S. Pat. No. 3,143,954 discloses a beverage preparation machine that presents an actuation device adapted for moving a strip carrying a plurality of single doses successively to an extraction device. Said actuation device of the strip of single doses is disposed upstream of the extraction device and presents four actuation sides adapted for successively interacting with each of said sides with a single dose of the strip of doses. In this type of solution the strip of doses is moved by the actuation device by means of traction, in a generally upward movement whereby the extraction device actuates as back-pressure, disposed on the side of the strip of doses opposite to the side that engages with the actuation device and thereby enables a more effective traction thereof. Moreover, this type of solution is only applicable to packages in non-hermetic material, for example in the form of filter paper or similar, not requiring perforation means for producing flow entry and/exit passageways of the extraction flow.

Document U.S. Pat. No. 3,213,777 presents a machine of similar type that presents a similar traction mechanism, also provided so as to circulate a strip of doses by means of traction thereof along an ascending movement, from an upstream vertical direction to a downstream horizontal direction. This type of general disposition requires a bigger actuation force of the traction mechanism given that the latter operates in the direction opposite the direction of the gravity force. Moreover, the document discloses an actuation element of the rotation pulley type that comprises several collection zones provided along a respective perimeter surface and configured so as to collect at least part of the single dose portions.

Document GB 2266228 discloses a machine of the same type, including an actuation element presenting a perimeter rebound that projects from the perimeter actuation surface and a back-pressure element disposed in opposition and presenting elastic means. This solution does not represent an optimum in terms of transmission of movement given that the back-pressure element only exerts a punctual force and not directly opposing upon the perimeter actuation surface of the actuation element. The interaction of traction does not unfold along an extension of said perimeter actuation surface and including a variation of the displacement direction of said single dose support.

Document WO 2013/169134 A2 registered by the applicant of the present invention discloses a machine for preparing beverages of the same type and adapted for processing a conduction support that provides a substantially hermetic envelope to a plurality of single doses. Said machine further comprises actuation means of said conduction support adapted so as to supply said doses successively to a respective extraction device, thereby resulting in a general compact disposition where the extraction device is disposed in relative proximity underneath of the exit of storage means and actuates the conduction support from a horizontal direction upstream to a vertical direction downstream, favoring the action of gravity force. However, the document does not disclose a solution that guarantees a high transfer of movement by means of traction between the actuation surface of the actuation element and of the support of single portions.

None of the documents in the prior discloses an efficient and reliable solution for the displacement of a support of single portions in a strip format or similar, in particular in the case the latter is actuated by a single actuation device disposed upstream of a respective extraction device, and without additional actuation elements, for example in the form of engagement protrusions in the longitudinal edges of said support of single portions.

GENERAL DESCRIPTION OF THE INVENTION

The objective of the present invention is to provide a machine for preparing beverages, such as for example espresso type coffee, tea and similar, notably by means of extraction of aromatic substances packaged in single dose portions, such as for example capsules, pods and similar, provided in a common strip-like or similar support, that provides a greater flexibility of supply of said support of single portions, and therefore of said single dose portions, to an extraction device, together with a reduced construction complexity.

This objective is solved according to the present invention according to claim 1.

Preferred embodiments are presented in the depending claims.

Another objective of the present invention is to provide a process for preparing beverages based upon a machine of the type of the present invention and that results more flexible.

This objective is solved according to the present invention by means of a process for preparing beverages according to claim 14.

According to a preferred embodiment, said process further includes the steps of separation of said single dose portion that is furthest downstream from the remanding support of single portions upstream, so that the single dose portion falls inside of said extraction device, closing said extraction device, injection of water into said extraction device so as to obtain a respective beverage.

According to another preferred embodiment, the steps of the process are repeated in each cycle of beverage preparation, by means of rotation of said actuation element corresponding to the advancement by one position in each operation cycle.

DESCRIPTION OF THE FIGURES

The invention shall now be explained in greater detail based upon preferred embodiments and in the attached figures.

The Figures show, in simplified schematic representations.

DESCRIPTION OF PREFERRED EMBODIMENTS OF THE INVENTION

As aforementioned, there are known in the prior art machines (1) for preparing beverages adapted for the use of single dose portions (22) provided successively in a common strip-like or similar support (21), whereby said single dose portions (22) present a first and second package walls (23, 24) substantially hermetic to air.

Figure 1:
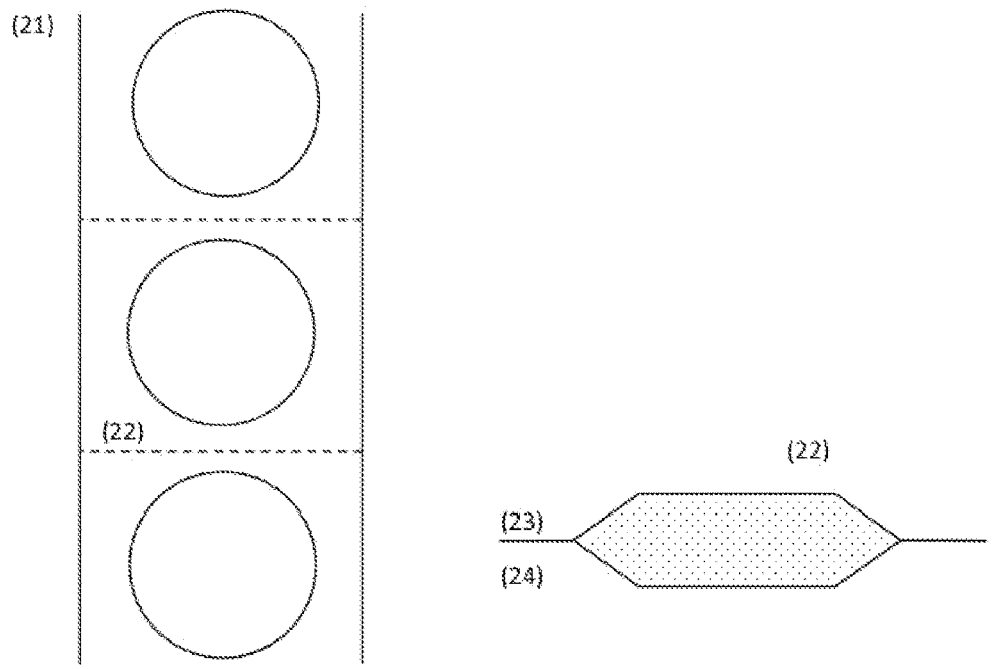
FIG. 1: top view of a support (21) of single portions (of the right-side) and side view of a single dose portion (22) according to the prior art.

FIG. 1 represents views of a support (21) of single portions according to the prior art.

Figure 2:
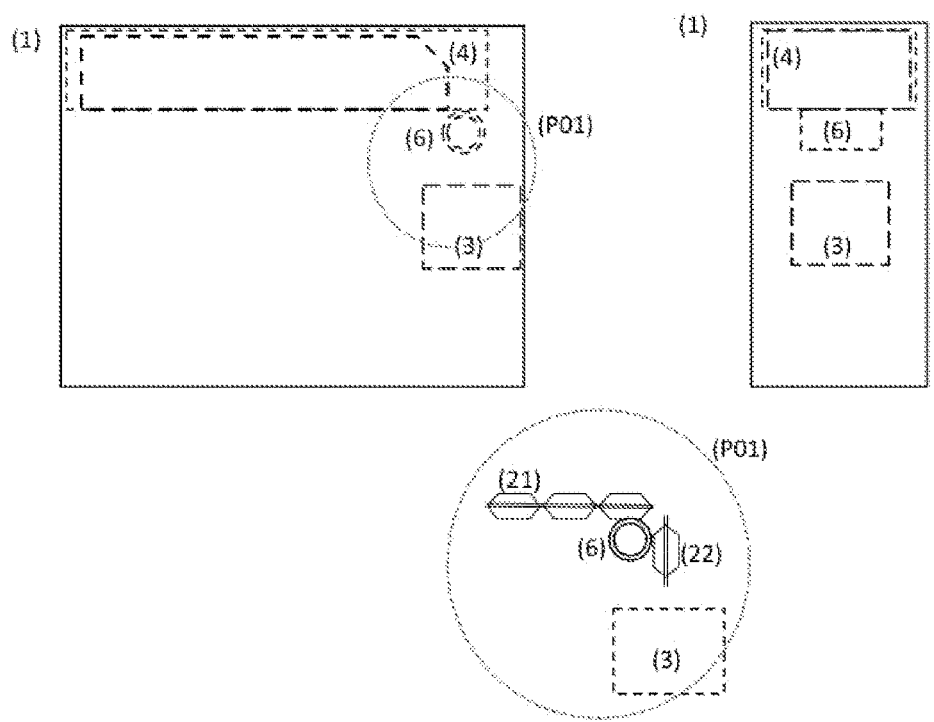
FIG. 2: side view (top, left-side) and front view (top, right-side), as well as detail P01 (bottom), of a beverage preparation machine according to the prior art, adapted for use of a support (21) of single portions according to FIG. 1.

FIG. 2 represents one said machine (1) for preparing beverages according to the prior art, presenting a storage means (4) adapted for collecting a support (21) of single portions, at least one extraction device (3) adapted so as to collect one said single dose portion (22) inside thereof, and at least one actuation device (6) disposed upstream of said extraction device (3) and presenting one actuation element (61) provided so that it can move said support (21) of single portions by means of traction in rotation and thereby successively supply respective single dose portions (22) to said extraction device (3).

In particular, as one can better observe in the detail P01 of FIG. 2, said actuation device (6) includes an actuation element (61) adapted so that it can rotate and thereby exert a traction force upon said support (21) of single portions.

Figure 3:
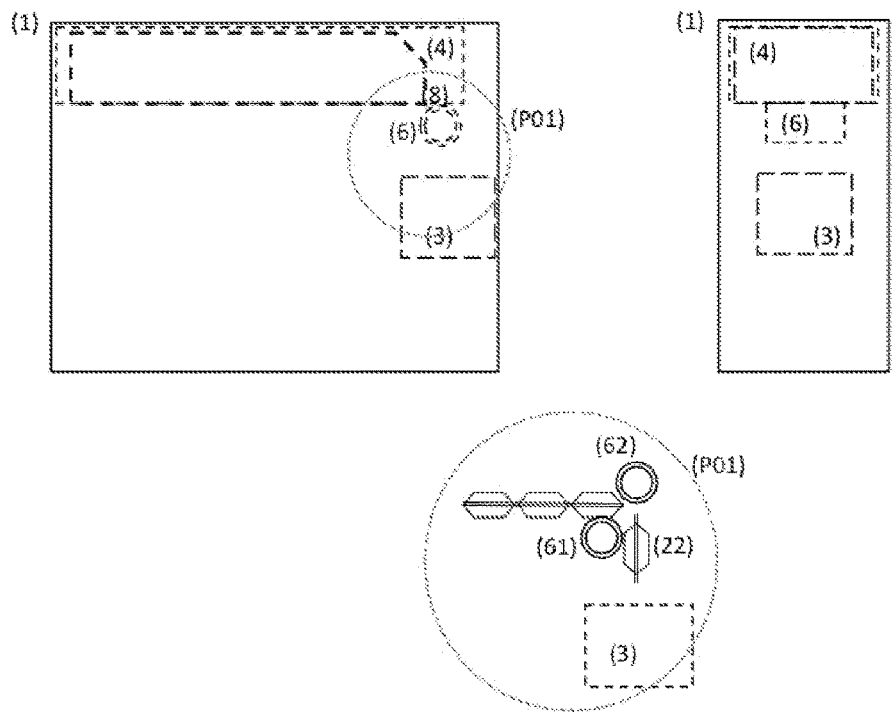
FIG. 3: side view (top, left-side) and front view (top, right-side), as well as detail P01 (bottom), of a first embodiment of a machine (1) for preparing beverages according to the invention.

FIG. 3 represents a first embodiment of the machine (1) for preparing beverages according to the invention in similar views to those of FIG. 2. In particular, according to a first inventive aspect of the present invention, said actuation device (6) further presents a back-pressure element (62) provided in direct opposition to said actuation element (61) so as to exert a joint back-pressure upon said support (21) of single portions and upon at least part of the extension of traction interaction of the perimeter actuation surface (63) with said support (21) of single portions, and disposed in a relative position so as to vary the circulation direction of said support (21) of single portions along said perimeter actuation surface (63).

As an expert in the field should readily understand it, the application of a back-pressure force upon said support (21) of single portions, at least in the zone of interaction with the perimeter actuation surface (63), shall tend to increase the transmission of movement by means of traction. This solution greater reliability of the displacement of said support (21) of single portions, in particular in the case of a disposition with only one actuation device (6) in the downstream zone and without additional engagement elements, for example in the form of engagement protrusions provided in the longitudinal edges of said support (21) of single portions.

Moreover, said support (21) of single portions is supplied to said actuation element (61) along a substantially horizontal direction upstream thereof, and is thereafter supplied to said extraction device (3) along a substantially vertical direction downstream thereof, whereby said back-pressure element (62) exerts a back-pressure force upon said support (21) of single portions along an extension of perimeter actuation surface (63) that includes said change of direction, as the latter passer by the perimeter actuation surface (63) of said actuation element (61) that carries out the transfer of movement by means of traction. As it should be readily understood by an expert in the field, there thus results a greater extension of the traction transfer zone and, therefore, an enhanced traction transfer between said perimeter actuation surface (63) and said support (21) of single portions.

Figure 4:
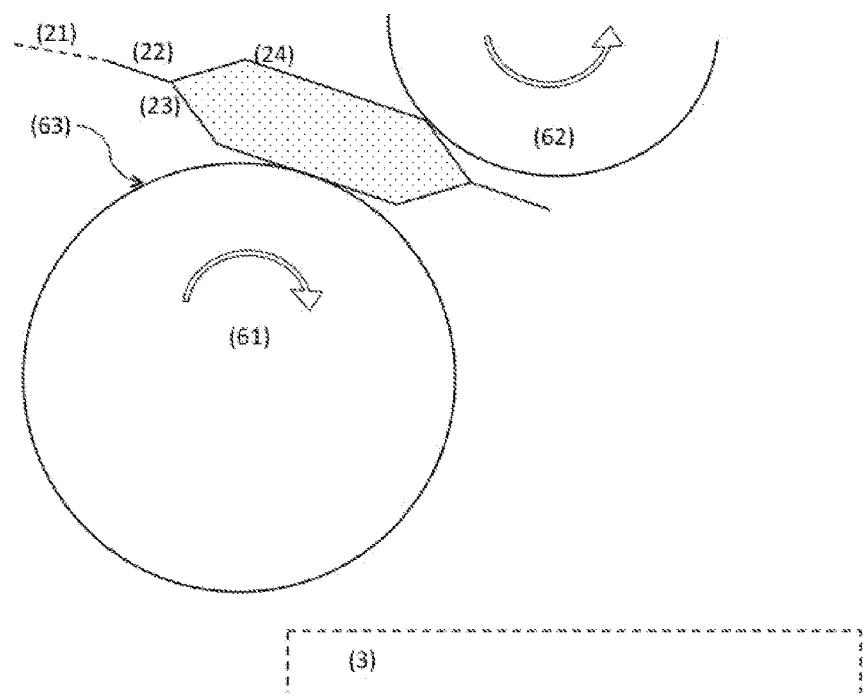
FIG. 4: detail view of a first embodiment of an actuation device (6) in a machine (1) for preparing beverages according to the invention.

This general disposition of the actuation device (6) can be better observed in FIG. 4.

As one can better observe in FIG. 4, said machine (1) for preparing beverages presents a back-pressure element (62) that in this case is provided as a pulley-like element (only partially represented, in its inferior part), or similar, and that is actuated in rotation along a direction opposite to that of said actuation element (61). According to a preferred embodiment, said back-pressure element (62) is thus provided so as to exert a back-pressure upon said support (21) of single portions, preferentially including the cross extension thereof, along at least part of said perimeter actuation surface (63), preferentially upon at least part of a first quadrant in the rotation direction of said actuation element (61).

According to a preferred embodiment, said back-pressure element (62) configures jointly with said perimeter actuation surface (63) a space for passage of said support (21) of single portions that extends adjacent and along at least part of said extension of traction interaction of said perimeter actuation surface (63) with said support (21) of single portions. As it should be understood, this relative disposition provides an enhancement of the transfer of movement by traction and supports the change of direction of said support (21) of single portions.

According to another preferred embodiment, said back-pressure element (62) is provided so as to exert a back-pressure in surface including at least part of the cross extension of said support (21) of single portions, preferentially upon at least part of a first quadrant in the direction of rotation of said actuation element (61).

Figure 5:
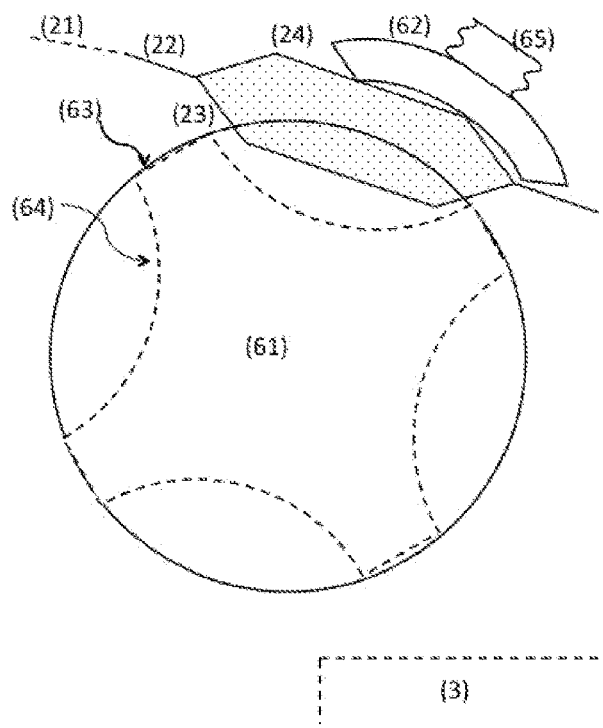
FIG. 5: detail view of a second embodiment of an actuation device (6) in a machine (1) for preparing beverages according to the invention.

FIG. 5 represents a second embodiment of the machine (1) for preparing beverages according to the invention, whereby said actuation element (61) presents a plurality of engagement zones (64) distributed by the perimeter actuation surface (63) and provided as concave regions configured in similar manner to part of the dose of said single dose portions, and at least part of said back-pressure element (62) provides a curved back-pressure surface, preferentially of similar curvature as said perimeter actuation surface (63).

According to a preferred embodiment, said back-pressure element (62) provides a back-pressure surface developing at least in part substantially parallel to said perimeter actuation surface (63). That is, as represented in FIG. 5, at least part of the back-pressure element (62) advantageously presents a curvature similar to the perimeter actuation surface (63) so as to better transfer the traction movement between the actuation element (61) and the support (21) of single portions.

According to another preferred embodiment, at least part of said back-pressure element (62), in this case the totality thereof, is provided fixed relative to said actuation element (61).

Moreover, according to another preferred embodiment, said back-pressure element (8) is provided with elastic means (65)—represented in merely schematic manner—that act so as to reinforce the pressure that the latter exerts upon said actuation element (61) along at least part of the first quadrant of rotation of said actuation element (61). Different types of elastic means can be considered in this particular, according to the embodiment of associated back-pressure element (62).

Figure 6:
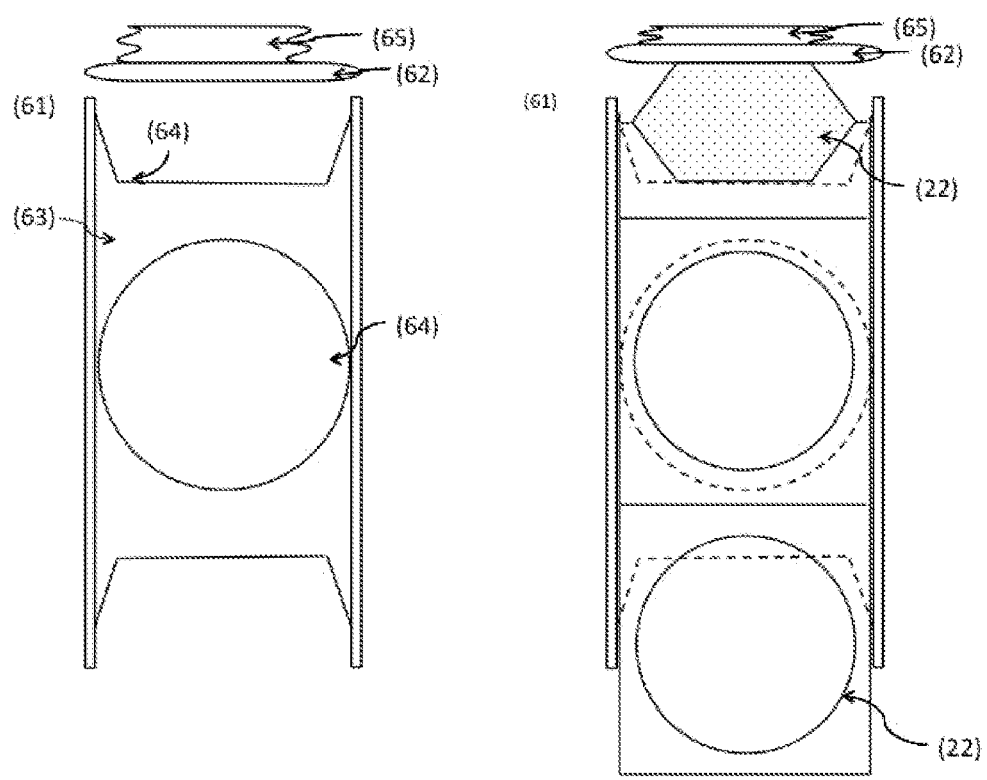
FIG. 6: top views of the embodiment of an actuation device (6) according to FIG. 5, in a machine (1) for preparing beverages according to the invention.

FIG. 6 represents the embodiment of the actuation device (6) according to FIG. 5, in top views without (on the left-side) and with the support (21) of single portions, whereby the supply direction of the latter develops upwards in the drawing.

Figure 7:
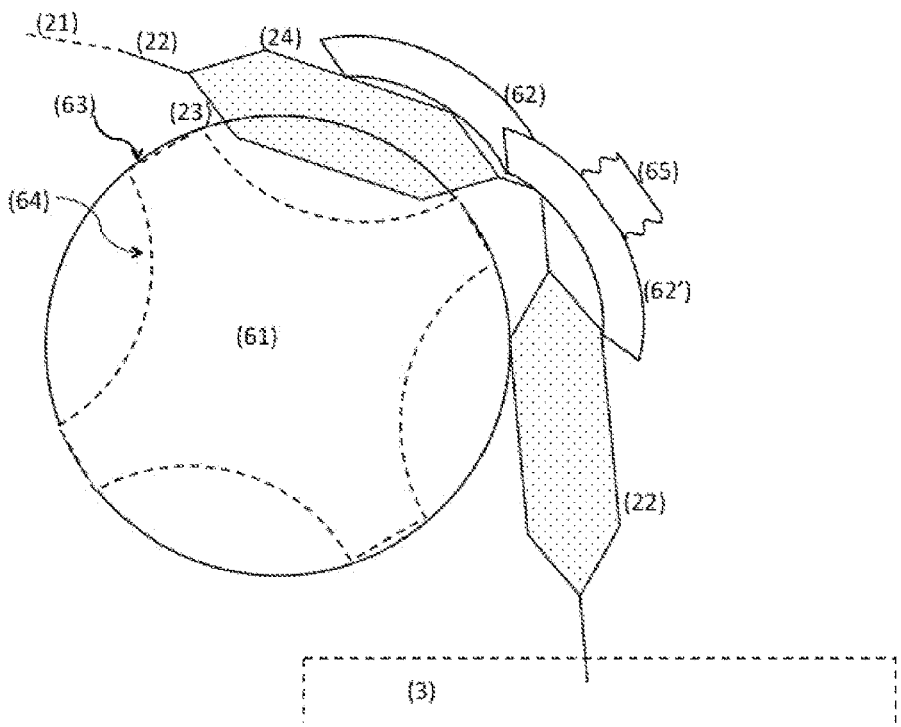
FIG. 7: detail view of a third embodiment of an actuation device (6) in a machine (1) for preparing beverages according to the invention.

FIG. 7 represents a third embodiment of the machine (1) for preparing beverages according to the invention, whereby said back-pressure element (62) presents a first part disposed upstream and provided so as to swivel relative to a second part disposed downstream. It thus advantageously results that said first part of the back-pressure element (62) can adjust itself in elastic manner, by means of said elastic means (not represented), to the variation of the dimension of said support (21) of single portions, in particular in the zone of respective single dose portions (22), and thus facilitating a respective displacement under pressure along the perimeter actuation surface (63).

Figure 8:
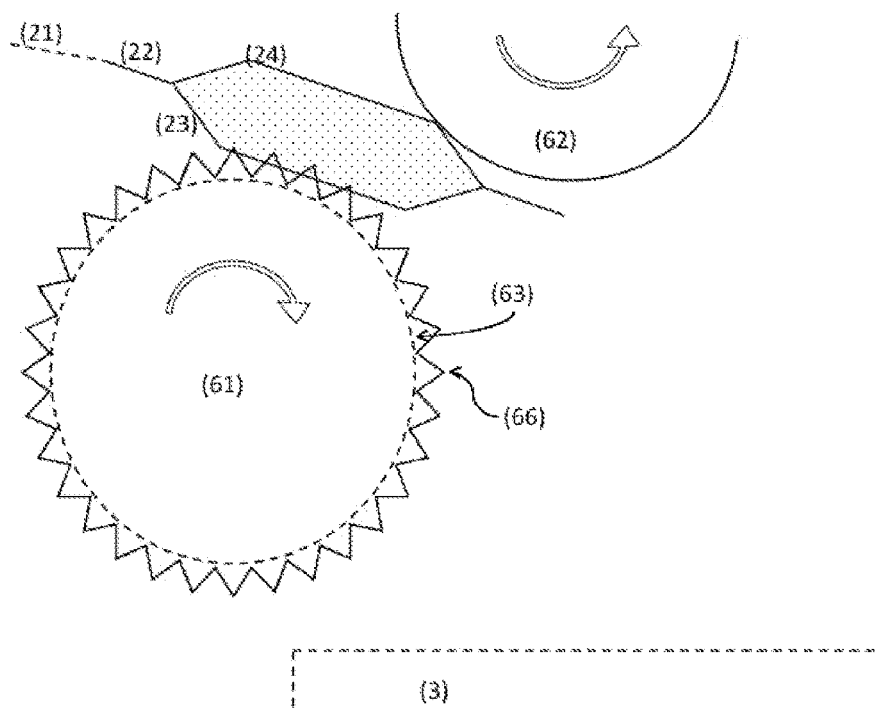
FIG. 8: detail view of a fourth embodiment of an actuation device (6) in a machine (1) for preparing beverages according to the invention.

FIG. 8 represents a fourth embodiment of the machine (1) for preparing beverages according to the invention, whereby said perimeter actuation surface (63) presents a plurality of actuation protrusions (66) adapted so that they can engage with said support (21) of single portions. According to a preferred embodiment, said actuation protrusions (66) are provided as a pattern of protruding elements presenting a configuration, dimension and density adapted so as to increase the effect of adherence of said perimeter actuation surface (63) and, therefore the transmission of traction to said support (21) of single portions. According to an alternative embodiment, said actuation protrusions (66) are provided as a pattern of protruding elements presenting a configuration, dimension and density adapted so as to perforate or provoke the rupture of corresponding zones of the single dose portions (22).

Figure 9:
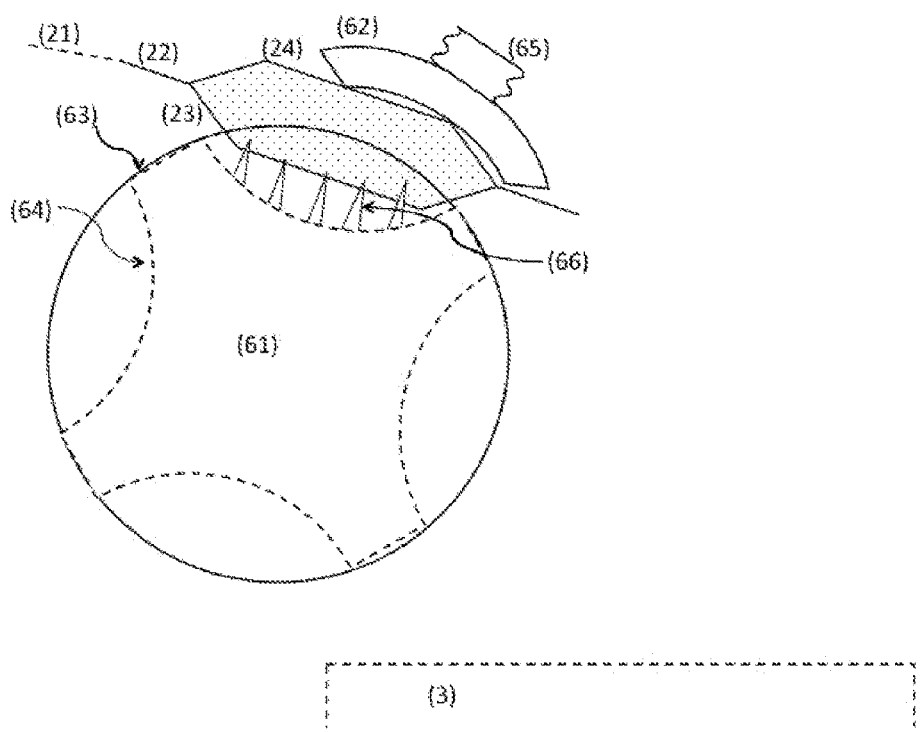
FIG. 9: detail view of a fifth embodiment of an actuation device (6) in a machine (1) for preparing beverages according to the invention.

FIG. 9 represents a fifth embodiment of a machine (1) for preparing beverages according to the invention, whereby said plurality of actuation protrusions (66) is provided in said engagement zones (64). It is herewith provided the possibility of enhancing the transmission of movement by means of traction exerted by the actuation element (61) to said support (21) of single portions.

Figure 10:
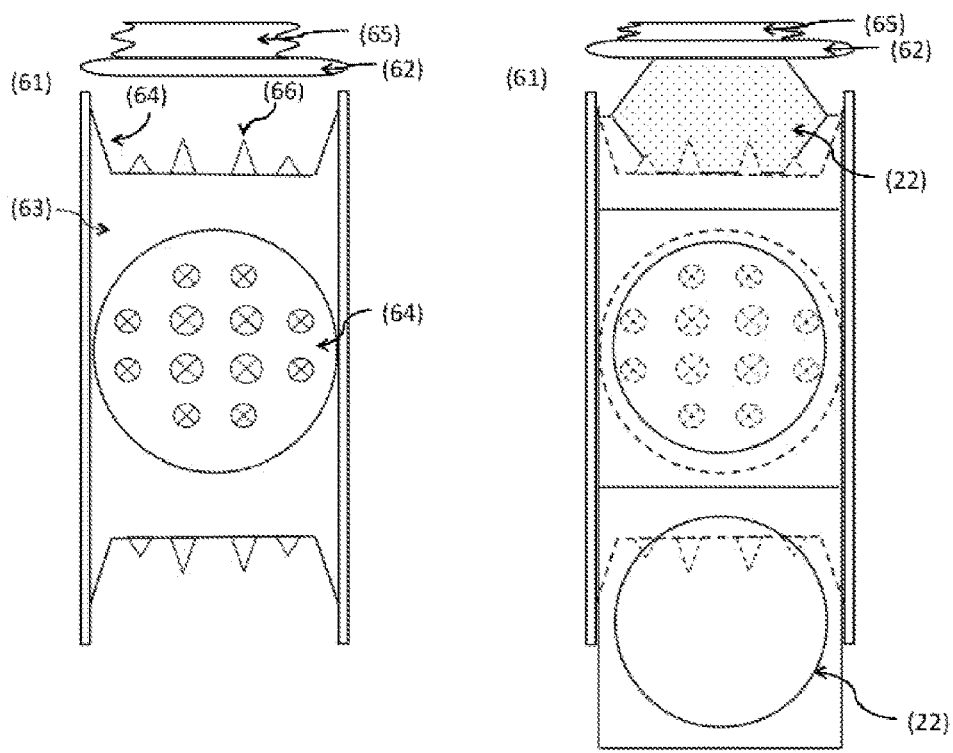
FIG. 10: top views of an embodiment of the actuation device (6) according to FIG. 9, in a machine (1) for preparing beverages according to the invention.

FIG. 10 represents top views of an embodiment of actuation element (61) according to FIG. 9. As one can observe, said actuation protrusions (66) are in this case provided so as to produce flow passageways in at least one of the package walls (23, 24) of the single dose portions (22).

The invention claimed is:

1. A machine (1) for preparing beverages and presenting:
   at least one storage means (4) adapted for collecting a support (21) having single portions that are provided in a strip-like form in an axial direction, and that comprise a plurality of successive single dose portions (22), each single dose portion presenting a first and a second package wall (23, 24) substantially hermetic to air and being separable from the strip-like form,
   at least one extraction device (3) adapted so as to collect inside thereof a single dose portion (22) that has been separated from the strip like form, and
   at least one actuation device (6) upstream of said extraction device (3) and presenting an actuation element (61) that has a perimeter actuation surface (63) and is rotatable about an axis orthogonal to said axial direction, said actuation surface being formed so that said actuation element can move said support (21) of single portions in strip-like form by means of traction along said perimeter actuation surface (63) and effect a movement and separation of a single dose portion from the strip-like form to thereby supply respective single dose portions (22) successively to said extraction device (3),
   wherein said actuation device (6) further presents a back-pressure element (62) provided in direct opposition to said actuation element (61) and is operative so as to exert a back-pressure upon said single portions and upon at least part of the extension of traction interaction of the perimeter actuation surface (63) with said single portions, and disposed in a relative position so as to permit separation of a single dose portion from the strip-like form and vary the circulation direction of said single portions along said perimeter actuation surface (63).

2. The machine (1) according to claim 1, characterized in that said back-pressure element (62) configures, together with said perimeter actuation surface (63), a space for passage of said support (21) of single portions that extends in adjacent manner along at least part of said extension of traction interaction of said perimeter actuation surface (63) with said support (21) of single portions.

3. A machine (1) for preparing beverages comprising:
   at least one storage means (4) adapted for collecting a support (21) having single portions that are provided in a strip-like form in an axial direction, and that comprise a plurality of successive single dose portions (22), each single dose portion presenting a first and a second package wall (23, 24) substantially hermetic to air and being separable from the strip-like form, at least one extraction device (3) adapted so as to collect inside thereof a single dose portion (22) that has been separated from the strip like form, and at least one actuation device (6) upstream of said extraction device (3) and presenting an actuation element (61) that has a perimeter actuation surface (63) and is rotatable about an axis orthogonal to said axial direction, said actuation surface being formed so that said actuation element can move said support (21) of single portions in strip-like form by means of traction along said perimeter actuation surface (63) and effect a movement and separation of a single dose portion from the strip-like form to thereby supply respective single dose portions (22) successively to said extraction device (3), wherein said actuation device (6) further presents a back-pressure element (62) provided in direct opposition to said actuation element (61) and is operative so as to exert a back-pressure upon said single portions and upon at least part of the extension of traction interaction of the perimeter actuation surface (63) with said single portions, and disposed in a relative position so as to permit separation of a single dose portion from the strip-like form and vary the circulation direction of said single portions along said perimeter actuation surface (63); and wherein said back-pressure element (62) is provided so as to exert a surface back-pressure including upon at least part of the cross extension of said support (21) of single portions, preferentially upon at least part of a first quadrant in the rotation direction of said actuation element (61), whereby said actuation element (61) is preferentially actuated in rotation in a downwards direction, in particular so that as to be supplied upstream along a substantially horizontal direction and to supply said extraction device (3) downstream, along a substantially vertical direction.

4. The machine (1) according to claim 1, characterized in that at least part of said back-pressure element (62) provides a curved back-pressure surface, preferentially presenting a curvature similar to said perimeter actuation surface (63).

5. The machine (1) according to claim 1, characterized in that said back-pressure element (62) provides a back-pressure surface developing at least in part substantially parallel to said perimeter actuation surface (63).

6. The machine (1) according to claim 1, characterized in that said back-pressure element (62) is provided fixed relative to said actuation element (61).

7. The machine (1) according to claim 1, characterized in that said back-pressure element (62) is provided so that at least part can carry out a swivel movement relative to at least another part thereof.

8. The machine (1) according to claim 1, characterized in that said back-pressure element (62) is provided so that it can be rotated around a horizontal direction along a direction contrary to the one of said actuation element (61).

9. A machine (1) for preparing beverages comprising:
at least one storage means (4) adapted for collecting a support (21) having single portions that are provided in a strip-like form in an axial direction, and that comprise a plurality of successive single dose portions (22), each single dose portion presenting a first and a second package wall (23, 24) substantially hermetic to air and being separable from the strip-like form, at least one extraction device (3) adapted so as to collect inside thereof a single dose portion (22) that has been separated from the strip like form, and at least one actuation device (6) upstream of said extraction device (3) and presenting an actuation element (61) that has a perimeter actuation surface (63) and is rotatable about an axis orthogonal to said axial direction, said actuation surface being formed so that said actuation element can move said support (21) of single portions in strip-like form by means of traction along said perimeter actuation surface (63) and effect a movement and separation of a single dose portion from the strip-like form to thereby supply respective single dose portions (22) successively to said extraction device (3), wherein said actuation device (6) further presents a back-pressure element (62) provided in direct opposition to said actuation element (61) and is operative so as to exert a back-pressure upon said single portions and upon at least part of the extension of traction interaction of the perimeter actuation surface (63) with said single portions, and disposed in a relative position so as to permit separation of a single dose portion from the strip-like form and vary the circulation direction of said single portions along said perimeter actuation surface (63); and wherein said back-pressure element (62) is provided with elastic means (65) that act so as to pressure said back-pressure element (62) against said actuation element (61) along at least part of the first quadrant of rotation of said actuation element (61).

10. The machine (1) according to claim 1, characterized in that said actuation element (61) and/or said back-pressure element (62) presents a plurality of actuation protrusions (66) provided as a pattern of protruding elements presenting a configuration, dimension and density adapted so as to increase the effect of adherence of said perimeter actuation surface (63) and, therefore, the transmission of traction to said support (21) of single portions.

11. The machine (1) according to claim 1, characterized in that said actuation element (61) presents a plurality of engagement zones (64) upon said perimeter actuation surface (63) and configured as a concavity so as to engage with one said single dose portion (22) of said support (21) of single portions, whereby said engagement zones (64) present a plurality of actuation protrusions (66).

12. The machine (1) according to claim 10, characterized in that said actuation protrusions (66) present a configuration, dimension and density adapted so as to not perforate and/or break said single dose portion (22), and are provided along most part of the cross extension of said perimeter actuation surface (63).

13. The machine (1) according to claim 10, characterized in that said actuation protrusions (66) present a free edge adapted so as to perforate and/or break said single dose portion (22) in respective locations, and in that said actuation protrusions (66) are provided in a matrix-like, mesh-like or similar distribution, including of circular or rectangular type, and adapted so as to perforate or cause the rupture of a respective single (22) dose portion.

14. A process for preparing an aromatic beverage, comprising the steps:
providing a machine (1) for preparing beverages, in particular a machine (1) for preparing beverages referred in claim 1, that presents an actuation device (6) comprising an actuation element (61) provided so that it can rotate around a substantially horizontal axis and disposed upstream of an extraction device (3);

providing a support (21) of single portions in a strip-like form or similar that presents a plurality of successive single dose portions (22);

bringing a first single dose portion (22) that is furthest downstream on said support (21) of single portions into interaction with an exterior perimeter surface (63) of said actuation element (61), driving said actuation element (61) in a rotation movement so that it displaces said support (21) of single portions by means of traction;

exerting pressure upon the surface of said support (21) of single portions by means of a back-pressure element (62) provided in opposition to said actuation element (61).

15. The process according to claim 14, characterized in that said support (21) of single portions is supplied to said actuation element (61) along a substantially horizontal direction upstream and is supplied to said extraction device (3) along a substantially vertical direction downstream, whereby said back-pressure element (62) exerts a back-pressure force upon said support (21) of single portions as the latter passes by the perimeter actuation surface (53) of said actuation element (61) that transfers the movement by traction.

* * * * *